United States Patent [19]

Broding

[11] 3,987,406
[45] Oct. 19, 1976

[54] SEISMIC GROUP RECORDER CONTROL SYSTEM
[75] Inventor: Robert A. Broding, Tulsa, Okla.
[73] Assignee: Standard Oil Company (Indiana), Chicago, Ill.
[22] Filed: Aug. 27, 1975
[21] Appl. No.: 608,137

[52] U.S. Cl. .......................... 340/15.5 TS; 325/30; 325/45; 346/33 C
[51] Int. Cl.² ...................... G01V 1/22; H04B 7/14
[58] Field of Search ............ 340/15.5 TS, 150, 151, 340/188 CH, 261; 325/30, 45; 346/33 C; 178/66 A, 66 R

[56] References Cited
UNITED STATES PATENTS

| | | | |
|---|---|---|---|
| 2,700,753 | 1/1955 | Peterson | 340/15.5 TS |
| 3,764,913 | 10/1973 | Ochel et al. | 325/30 |
| 3,773,975 | 11/1973 | Koziol | 178/66 R |
| 3,794,928 | 2/1974 | Stump et al. | 325/30 |
| 3,806,864 | 4/1974 | Broding et al. | 346/33 C |
| 3,838,342 | 9/1974 | Bjorkman | 325/45 |
| 3,886,494 | 5/1975 | Kostelniak et al. | 340/15.5 TS |
| 3,916,371 | 10/1975 | Broding | 340/15.5 TS |

*Primary Examiner*—Nelson Moskowitz
*Attorney, Agent, or Firm*—Newell Pottorf

[57] ABSTRACT

In seismic group recording, each seismic trace is initially digitally recorded by a small, portable, magnetic recorder placed near the corresponding seismometer recorder group. A large number of such groups and corresponding recorders are placed over an area or along a profile line, and from a control point, only those specific recorders needed for a given set of record traces are turned on at any time by transmitting a set of coded signals over a communications link which is usually a radio link. The bandwidth restrictions of licensed geophysical radio channels can cause difficulty in this communications system from control point to the various seismometer groups. Accordingly, this disclosure covers an improvement in the communication method employed in a seismic group recorder system. U.S. Pat. No. 3,806,864 teaches the employment of audio frequency encoding on a frequency-modulated band-limited channel with a maximum audio frequency of approximately 3 kilohertz. As initially used, on-off keying of three different tones was employed, due to simplicity. The present system is an improvement employing coherent frequency-shift keying, in which several different audio frequencies, bearing certain relations to each other, are employed. This results in near optimum communication for control of the seismic group recorder system over a voice-grade standard, geophysical licensed radio link.

7 Claims, 5 Drawing Figures

SEISMIC GROUP RECORDER CONTROL SYSTEM

CROSS REFERENCE TO RELATED APPLICATIONS

U.S. Patent application Ser. Nos. 393,694, filed Aug. 31, 1973 and now U.S. Pat. No. 3,916,371 529,308, filed Dec. 4, 1974 and now U.S. Pat. No. 3,952,283 and 572,493 are related since they concern the seismometer group recorder, but have no direct bearing on this invention.

BACKGROUND OF THE INVENTION

This invention relates to seismic geophysical surveying. Specifically, it is directed to a system in which each seismic trace is recorded at a group location and without the need for multiconductor cables or equivalent to transmit received seismic signals from the individual groups forming the seismic spread, to a central recording point. In this particular system, small, portable recording units are placed at the seismometer group locations. Each such portable recording unit including a source of electric power. Since such sources use conventional batteries and must necessarily be severely limited in available energy in order to maintain small size, hence mobility of the system, it is extremely desirable that each such unit be turned on as nearly as possible coincident with the time at which recordings are to be made, and turned off promptly after the recording. This makes maximum use of the limited battery energy available at the various group recorders. Accordingly, seismic group recorders have been arranged for turning-on from a remote point, referred to as the control point, ordinarily by means of a radio link, or its equivalent. This requires that all seismic group recorders must be within communication range of the control point. Ordinarily, as mentioned above, this link is radio, employing the licensed transmission bands available. This particular invention constitutes an improvement in the communications employed in such a system, so that maximum range for turning on with accuracy the selected group recorders and transmitting necessary identifying information is secured for taking each record.

DESCRIPTION OF THE PRIOR ART

This invention constitutes an improvement in the transmissions link of the system shown in U.S. Pat. No. 3,806,864, which is incorporated into this specification and forms a part thereof. Particularly applicable at this point is the statement of the prior art incorporated in that patent. It was there shown that necessary kinds of operating information, such as the selective turning on of certain of the group recorders placed in the field, the transmission of special information concerning the next record to be taken (sometimes called "header data"), the constant transmission of a synchronizing signal to all recorders so that digital sampling of the data to be recorded could be carried on at fixed-time intervals, and the like, are all required for obtaining useful seismic data. It was pointed out that these could be achieved using the ordinary geophysical licensed radio channels with their narrow audio band with maximum 3000 hertz, employing off-on keying of specific audio frequencies. Accordingly, encoding of the control signals is limited to this 3000-hertz frequency range.

It should be apparent that transmitting such items as the addresses of the various seismic group recorders that are to be actuated for a particular record, and the header data required at each location, requires a substantial period of time. A normal seismic recording or data-acquisition time is of the order of six seconds. Accordingly, it is desired that the commands or necessary control should cover a period much less than six seconds, actually the minimum that is possible. Preferably, a command time not to exceed three seconds is desirable in such a data-acquisition cycle. If one considers selective encoding of the turn-on signal, i.e., the transmission of the addresses of the seismic group recorders that are to be turned on, in connection with the use of 50 dual-channel seismic group recorders (i.e., 100 addresses), the maximum allowable time for each address is approximately 30 ms. If the encoding allows 1000 separate addresses from which the desired 100 are to be selected, use of three digits is necessary. If each digit is represented in binary code decimal, use of four bits per digit is required, or a total of 1200 bits for 100 addresses. Further consideration of false addressing requires that there be reliability in the addressing to avoid depleting tape. Therefore, a parity bit should be included in each digital address. Thus, 100 addresses requires 1500 bits minimum. In the formatting of the address code a sync bit is also required for each 16-bit word. Therefore, a grand total of 1600 bits is required to send 100 addresses.

A common sample interval in seismic recording is 2 ms. If one ties the command interval to this period, the address command alone requires 3.2 seconds for 100 addresses. Thus, the use of the 2-ms bit rate for address encoding is approximately the practical maximum time.

The system described in the patent given above uses the same time for the addressing, but its maximum transmission distance (i.e., the distance at which the signal-to-noise ratio is sufficiently great so that the units will be reliably turned on and off from the control point) is considerably less than one would want. Accordingly, the present invention, while still employing the licensed geophysical frequency audio band, employs coherent frequency-shift keying. The use of this system has improved the detection threshold of signal to noise, and the probability for error has been reduced by a factor of approximately 10 for signal-to-noise ratios in the order of 6 dB over the on-off key-tone systems disclosed in the above-mentioned U.S. Pat. No. 3,806,864 and the desired control range is obtained.

The use of coherent frquency-shift keying, as such a system is generically called, is, of course, not new with this invention. See, for example, the chapter, "Fundamental Data Modulation Techniques," by Seymour Stein, in the text *Digital Communication Systems*, furnished in Course 7317, Engineering Summer Conferences, University of Michigan, July 23–27, 1973. Coherent frequency-shift keying systems are also described in the text *Modern Communication Principles*, by Stein and Jones, McGraw-Hill Publishing Company, New York, 1967, and other places; for example, the text *Data Transmission*, by Bennett and Davey, McGraw-Hill Publishing Company, New York, 1965. Much of this work is based on the pioneering work of Mr. C. E. Shannon, which is, for example, covered in the text, *The Mathematical Theory of Communication*, by C. E. Shannon and W. Weaver, University of Chicago Press, Urbana, 1949.

Integration and dump filtering to reduce filter-response time and improve signal-to-noise ratio for control purposes is also generally known; the later references given above apply here.

However, this has not been employed in conjunction with a seismic group recorder system. The actual circuitry is novel in its simplicity by using countdown circuits to maintain all audio frequencies coherent, the filters employed at the receivers being sampled ("strobed") from the sampling frequency reference tone.

DESCRIPTION OF THE PREFERRED EMBODIMENT

Figure 1:
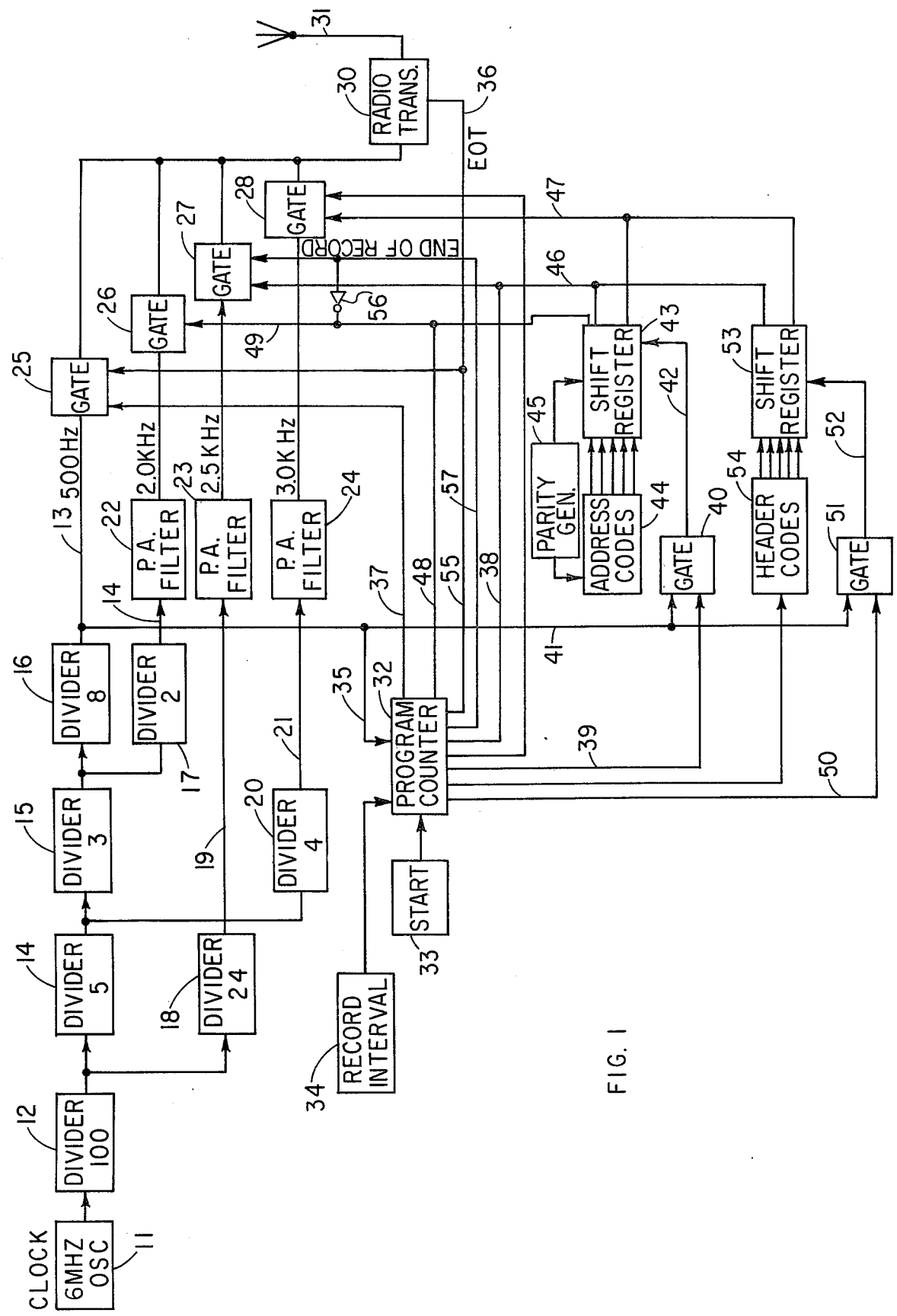
FIG. 1 is a diagrammatic representation of the system employed at the control point to put address codes and header codes onto a licensed geophysical frequency FM radio transmitter for employment at the seismic group recorders, in accordance with my invention.

It has been mentioned above that in the original embodiment of the cableless seismic digital recording system, as set out in U.S. Pat. No. 3,806,864, there was shown an arrangement for switching on and off the selected group recorders, conveying proper header data for the individual records, and applying certain commands, such as "start the tape," "cease recording," etc. A standard geophysical channel FM radio system was employed, in which the signals were sent as digital bits, i.e., logical 1's and 0's, at three different audio frequencies. In order to obtain adequate signal-to-noise ratio at required communication distances, filters were employed in the radio-receiving circuits and in the transmitting circuit. The system employed was what is commonly called on-off key tone systems. Three audio frequencies were employed, the example citing frequencies of 500, 2000, and 3000 hertz. There was no time relationship between the three audio signals, i.e., the system was what is called non-coherent. Accordingly, the detection of the transmitted code at the various radio receivers associated with the seismic group recorders simply depended upon the audio signal passing through the filters. In any filter, distinction between signal and noise is achieved at the expanse of extra time. Thus, in both the on-off and the frequency-shift keying systems on a non-coherent basis, a block of an integral number of cycles of a given audio tone is transmitted. This signal gradually builds up in amplitude in the filter tuned to the frequency of that signal, but it takes time for this buildup, and for a signal once built up to die off. For example, using a filter having a rather low selectively or "Q" of 10 for 3 kilohertz audio signals, the signal amplitude on the output of the filter builds up in a value of $1/\epsilon$ of the final value in approximately 0.5 ms. When input drops to zero output, the signal decays at this same rate. Accordingly, with these kinds of keying and detection, the bit density of the audio signals is limited by a period which is very close to T, where T is the duration of the block of constant amplitude audio signals sent by the transmitter.

There is an expedient in communication theory which has never before been applied in seismic operations, which is known as integrate and dump filtering. When this is employed, the period of the signal block sent (that is, in a single bit) can be made one-half of that discussed above, or the Q of the filters can be doubled for the same time period. Doubling the filter Q increases the detectability of the signal in noise. In this system, the various audio frequency filters are presented with the received, demodulated audio signal as before. However, after a time essentially T, where T is the duration of the signal bit, all filters are simultaneously shorted. The detection time is just before this shorting. This, then, requires two elements for employment. First, it is necessary to make the detection periodically at a time which is essentially the duration of the signal bit. Secondly, immediately after this detection, the filters must be shorted out and then immediately opened again to the incoming next signal bit, where the filtering action again proceeds. Furthermore, special arrangements are used in the transmitter to assure that the audio frequencies employed are in a fixed integral relationship with respect to each other. That is, these signals are made "coherent." The arrangement for transmitting the bits of signal at the various properly related audio frequencies is made such that each bit at any audio frequency starts off sinusoidally at the commencement of the time T at zero amplitude and builds to a constant peak amplitude. This signal is cut off at the end of the time T, which is chosen to occur at the end of an integral number of full cycles at that frequency. With this arrangement, it can be shown (and will be later described in connection with FIG. 4) that the amplitude of the filtered monofrequency block will be a maximum at the detection instant (that is, just before the instant that the filters are "dumped") for the filter tuned to that frequency, whereas, for all of the other filters, the output signal at this point is essentially zero. (For reference, see p. 39 of the University of Michigan reference in the chapter, "Fundamental Data Modulation Techniques," by Dr. Stein.)

In my seismic group recorder system, the preferable sampling rate is 2 ms, which gives a sampling or integrating period of precisely 2 ms. This corresponds to a base or sampling frequency of 500 hertz. If one selects coherent audio signal frequencies separated by exactly 500 hertz intervals above the base 500-hertz frequency, one obtains a maximum of audio frequencies that can be best detected. The maximum signal by virtue of the license required is 3 kilohertz. Accordingly, the system of my invention could use frequencies of 500 hertz, 1000 hertz, 1500 hertz, 2000 hertz, 2500 hertz, and 3000 hertz. Actually, I use only four audio frequency signals: 500 hertz basic timing, 2 kilohertz for commands, 2.5 kilohertz for logic 0's, and 3 kilohertz for logic 1's. Actually, this is equivalent to stating that if the maximum usable audio frequency licensed is $f_1$, the timing frequency is chosen to be $f_2$ where $f_2=f_1/N$ and $N$ is an integer which I prefer to have a value between 4 and 10, each block monofrequency being an integral multiple of $f_2$, one having the value $f_1$. Another preferably has the value $f_1-f_2$. Each of the frequencies above the 500-hertz timing system (that is, 2000, 2500, and 3000 hertz) are simultaneously filtered with integrate and dump filters with switches that quench all filters every 2 ms. The strobing pulses which are employed to actuate these electronic switches (actually FET switches) are derived from the 500-hertz timing signal. Detection takes place as mentioned above, i.e., signal utilization occurs at an instant just before the quenching of the filters.

It has earlier been mentioned that this is an improvement over the system described in U.S. Pat. No. 3,806,864. Accordingly, reference is made to the drawings illustrating the embodiment of the invention shown there, and only the parts of my system which differ from that are shown in this disclosure. In FIG. 1, for example, the audio frequency signaling frequencies employed, namely 500 hertz, 2.0 kilohertz, 2.5 kilohertz, and 3.0 kilohertz, are all derived as shown in FIG. 1 from a clock oscillator 11 operating at 6 megahertz. This passes through frequency dividers to obtain integrally related audio signaling frequencies. First is divider 12 producing an output frequency of 60 kilohertz, following which a multiplicity of frequency dividers are employed, depending upon the ultimate audio frequencies desired. It has already been stated that these frequencies should be related by integral multiples. Thus, for example, the signal from divider 12, which ultimately appears as a 500-hertz signal on line 13, achieves that status by passing through a divider of five at 14, one of three at 15, and one of either at 16. The same chain, except for the last divider, using instead a divider of 2 (17), leads to line 14, where the audio frequency is a precise 2.0 kilohertz. Similarly, taking off after divider 12 a divider of 24 (18) produces a frequency of 2.5 kilohertz precisely related to the above two frequencies. Finally, taking off after the divider 14 and employing a divider 20, which divides by a factor of four, produces on line 21 an audio frequency of precisely 3.0 kilohertz.

One requirement for the integrate and dump system has been met since the frequency relationships of all signal frequencies are integrally related, one being 500 hertz, another being four times this, a second five times this, and a third six times this value. In order to achieve maximum signal-to-noise ratio, the upper three frequencies are filtered by phase-adjustable filters 22, 23, and 24. In addition to the ordinary part of these audio-frequency filters, which can be as sharp as desired, the output signals used in the digital signaling blocks from the transmitter to the various receivers must be phase-adjusted to be coherent in each bit. Attention is called to the fact that there are four gates (25 to 28) which are simply extemely highspeed electronically controlled switches. They do not affect phase. Each of filters 22, 23, and 24 also contains simple phase-shifting networks capable of adjusting the phase of the filtered signal passing through it. In arranging the phase of these three filters, during the manufacture of the transmitting circuit shown in FIG. 1, a record is made of the output of the 500-hertz signal passing through gate 25 for an integral number of cycles, in this particular case, one cycle of 2-ms duration. A similar record is made for an identical gating of the 2, the 2.5, and the 3.0 kilohertz signals and the phases of these four are compared. By that is meant that these records are compared to find out whether, when the gate is turned on for the 500-hertz signal and the signal starts to increase from zero, at that same instant, gate 26 passes a signal of 2.0 kilohertz starting from zero amplitude and increasing sinusoidally in the same polarity as the 500-hertz output gate 25. The same is tested using gate 27 for the 2.5 kilohertz and gate 28 for the 3.0 kilohertz signals; the phase-shifting network in the phase-adjustable filters 22, 23, and 24 are varied until all of these signals are coherent at the output line 29, common to all of the outputs of the various gates. This signal frequency-modulates the radio transmitter 30 with its corresponding antenna 31, which is employed for the communications link to the seismometer group recorders (SGR's). Now, coherent signaling can be employed.

Figure 2:
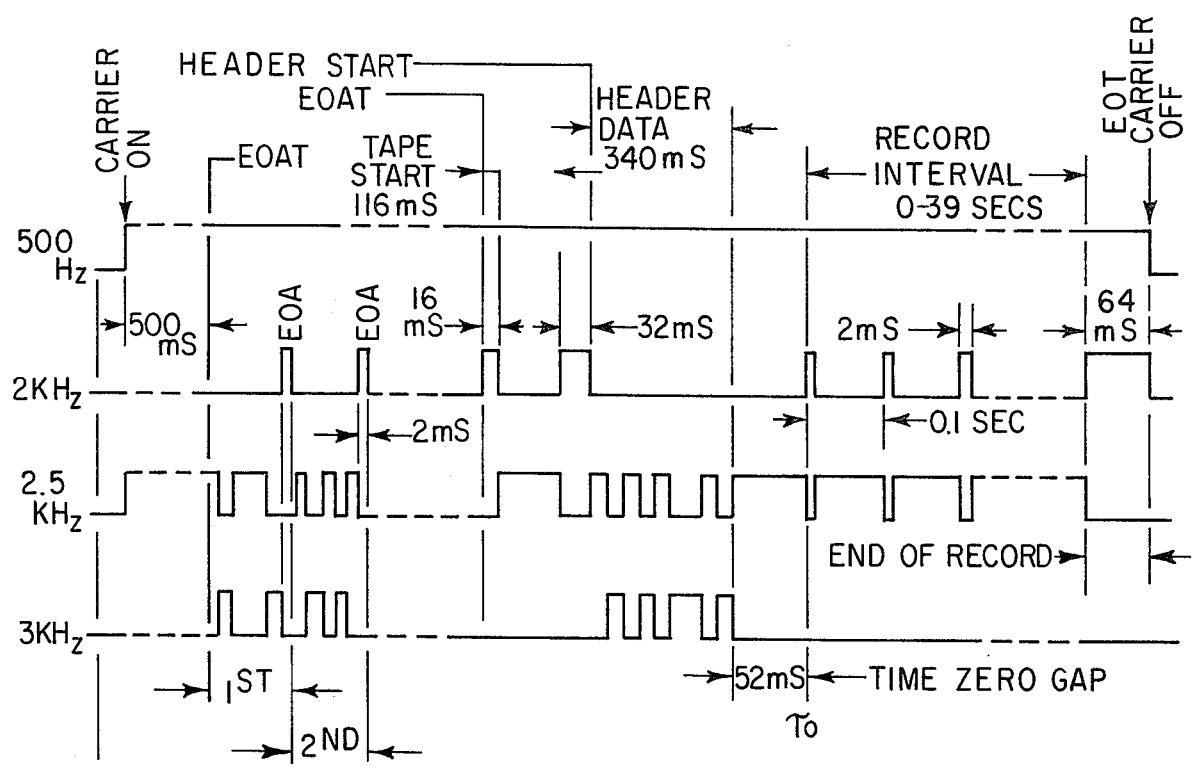
FIG. 2 is a time diagram showing a typical signaling system time chart.

FIG. 2 of the cited patent explained in detail the arrangement employed in frequency-shift keying, and accordingly it is felt that only those parts not found in that system need be reproduced. Accordingly, program counter 32 in my FIG. 1 corresponds to program counter 55 in FIG. 2 of the cited patent. When a start signal is put into the program counter 32 through unit 33, it sends out, at very carefully counted times, signals actuating the various gates to transmit the desired signals to the SGR's which are to be actuated.

For example, immediately upon actuation of the start, through line 36, the program counter 32 turns on the radio transmitter 30, or, more correctly, puts the carrier of this system on the antenna 31. Simultaneously, through line 37, the program counter turns on gate 25 and starts continuously modulating the 500-cycle timing frequency on line 13. This continues until the end of transmission and the "carrier off" signal, as will be described. At the same time, a 2.5-kilohertz signal also modulates the transmitter 30 through actuation of gate 27 by line 38. 500 ms later, a signal appears on line 39 from the program counter which goes to actuate gate 40. This is an AND gate also supplied with 500-cycle signal from line 41. The signal on line 39 causes this gate to send an actuation signal on line 42 to shift register 43. This shift register is employed, using frequency-shift keying at 2.5 and 3 kilohertz, to send out on lines 46 and 47 the logical 0's and 1's, respectively, from the address codes in the address code unit 44. The cited patent describes adequately one system for supplying the address codes, i.e., the numbers of the SGR units which are to be turned on during one particular cycle of operation of this transmission system shown in FIG. 1. A parity generator 45 is used in conjunction with the address code 44 for increased accuracy in transmission. This was also described in the cited application and no novel feature has been employed here. It was also described in that patent how, at the conclusion of the transmission of each address, the frequency-shift keying of the next address was held in abeyance until after a 2-ms "end of address (EOA)" signal was sent. In this particular case, this is carried out by the shift register through line 48 actuating the 2-kilohertz gate 26.

In order to follow this more easily, a time chart has been shown in FIG. 2, which corresponds to the operation of the transmitter shown in FIG. 1.

At the conclusion of the last address sent, a "tape start" signal is sent on the 2-kilohertz frequency. In order to do this, a 16-ms coherent signal is sent out from the program counter actuating gate 26 through line 48 and 49. During the next 142 ms, a 2.5-kilohertz signal is sent out by the program counter actuating gate 27 through line 38. Following this, to signal "header start," a 32-ms signal at 2 kilohertz is sent out by actuating gate 26 from the program counter through line 48. The preselected SGR's by now are turned on and ready for transmission of the header data. Accordingly, at this instant, an appropriate actuation signal comes from line 50 of the program counter to actuate gate 51, which has been continuously supplied with 500-hertz signal through line 41. This AND gate accordingly sends out an actuating signal on line 52 to shift register 53, which passes on the header code material already inserted into header code unit 54. This unit, again, is like that shown in the cited application, and no further reference is believed necessary. As with the transmission of the address codes, the shift register 53 actuates from binary code through frequency-shift keying (coherent system) on lines 46 and 47, as previously described for addresses. Header data is transmitted for approximately 340 ms, after which a 52-ms zero time gap is transmitted at 2.5 kilohertz through actuation of gate 27 by the program counter on line 38. The conclusion of this period is known as time zero, and is actually time for commencement of seismic recording, i.e., it is the instant at which the seismic wave to be investigated is initiated and sent into the ground. Systems to accomplish this are known already.

During the record interval, which is set by record interval unit 34 into the program counter and which is adjustable before each record taken, a 2-ms sample interval for a timing trace is sent out at 2 kilohertz each 0.1 second by appropriate actuation of gate 26. Since this unit was otherwise described in the cited patent, no further discussions need be given. Also, any time that this 2-kilohertz signal ceases, a 2.5-kilohertz signal is transmitted in these time intervals through gate 27 through transmitter 30.

At the end of the record interval which is timed by unit 34, the program counter sends out a 64-ms block of 2 kilohertz signal by appropriate actuation of gate 26 though line 57. This forms the end of record signal. Actually the signal is sent out on line 57 to turn off the 2.5-kilohertz gate 27, and simultaneously, through polarity reversing amplifier 56, acting on gate 26, turns this gate on for the 64 ms mentioned. At the end of this time, a signal, acting through line 55, turns off the radio transmitter. This is the instant known as "end of transmission (EOT)."

Figure 3:
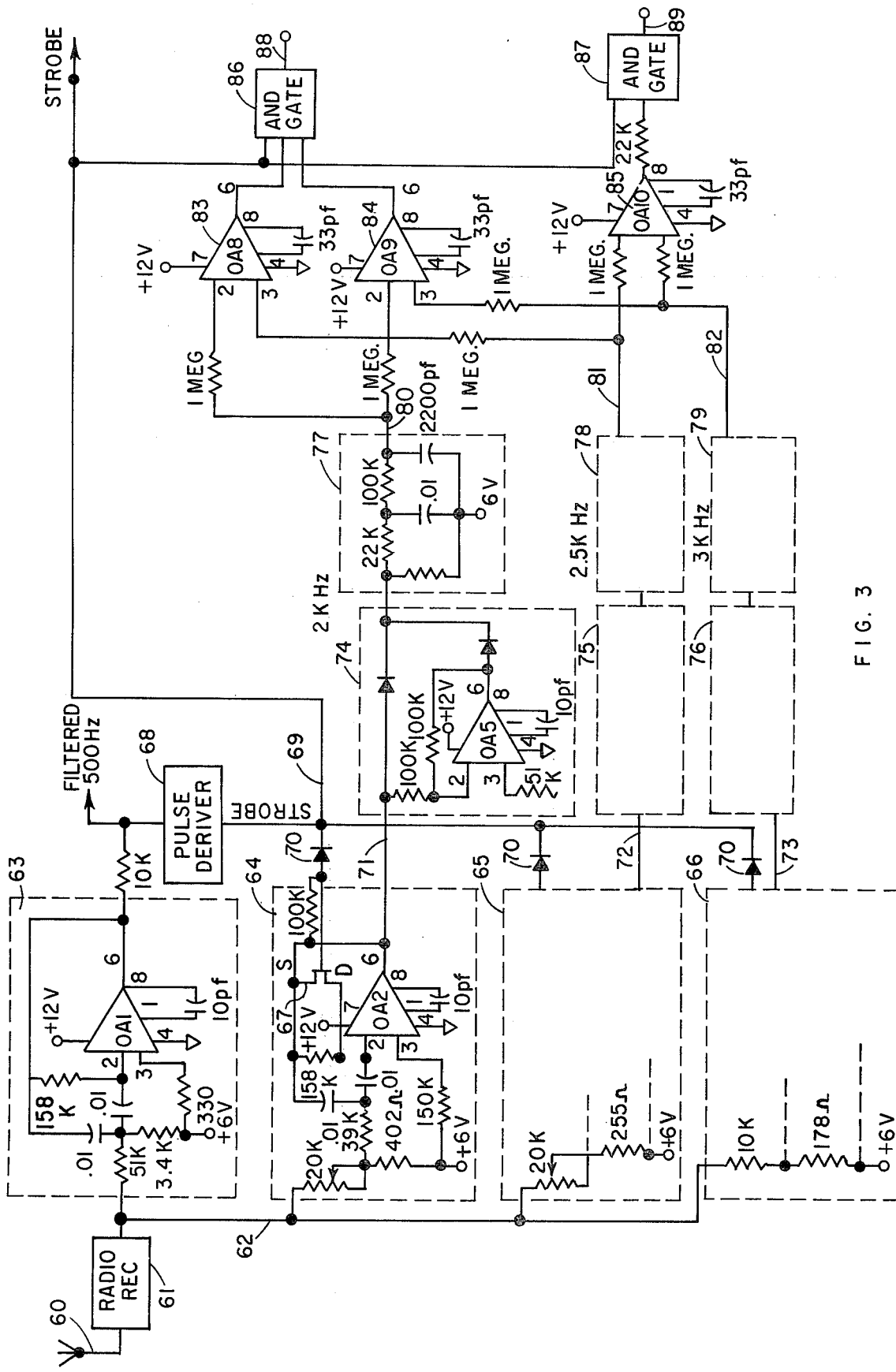
FIG. 3 shows in diagrammatic form (as well as detailed form) the various units employed at the individual seismic group recorders to utilize the coherent frequency-shift keying system shown in FIGS. 1 and 2.
Figure 5:
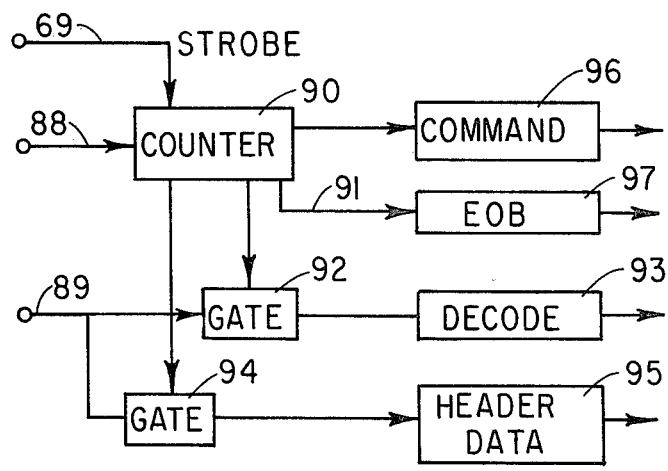
FIG. 5 is a diagrammatic representation of apparatus used in the individual recorders to separate decoded received signals for various command functions.

In FIGS. 3 and 5, only the parts of the circuits employed in the SGR which are unique to a coherent audio frequency communication system, are shown. That is, these are the circuits differing from the corresponding circuits shown in the cited patent.

In FIG. 3, the radio receiver 61 with its associated receiving antenna 60 is tuned to the carrier frequency of the communications link using transmitter 30. The demodulated audio part of the received signal is found on line 62, where it passes into a parallel combination of tuned amplifiers, each of which constitutes a filter. The complete circuit arrangement for the 500-hertz filter is shown in the dashed rectangle 63. In the circuits, capacitors are given in microfarads unless specially designated in picofarads. Resistors designated by "k" are in kilo ohms, otherwise in ohms. Duplicate circuits are not shown. The operational amplifier OA 1 can be, for example, a National Semiconductor type LM308. There are ten operational amplifiers in the part of the circuit shown in FIG. 3 (duplicate operational amplifiers having been omitted for simplicity) and all can be of the same type.

The three rectangles 64, 65, and 66 can be referred to as integrate and dump filters since they not only contain a tuned amplifier, but additionally a FET switch 67 which quenches the filter upon the receipt of a strobe pulse from the pulse deriver 68, acting on the filtered 500-hertz signal at the output of unit 63.

This pulse deriver 68 produces a very short duration pulse each two milliseconds. In this pulse deriver is first an overdriven amplifier which produces a square wave equivalent to the 500-hertz sine wave, and a derivative circuit to produce a sharp short pulse each time the square wave reverses polarity. By use of a diode, only one polarity pulse is transmitted to the strobe line 69. The output of the pulse deriver on line 69 (the strobe pulse) is coupled to the integrate and dump filter FET switch 67 through the steering diodes (also called isolaters) 70. This insures that the FET switch is actuated every two milliseconds during reception of signal by the receiver 61.

Figure 4:
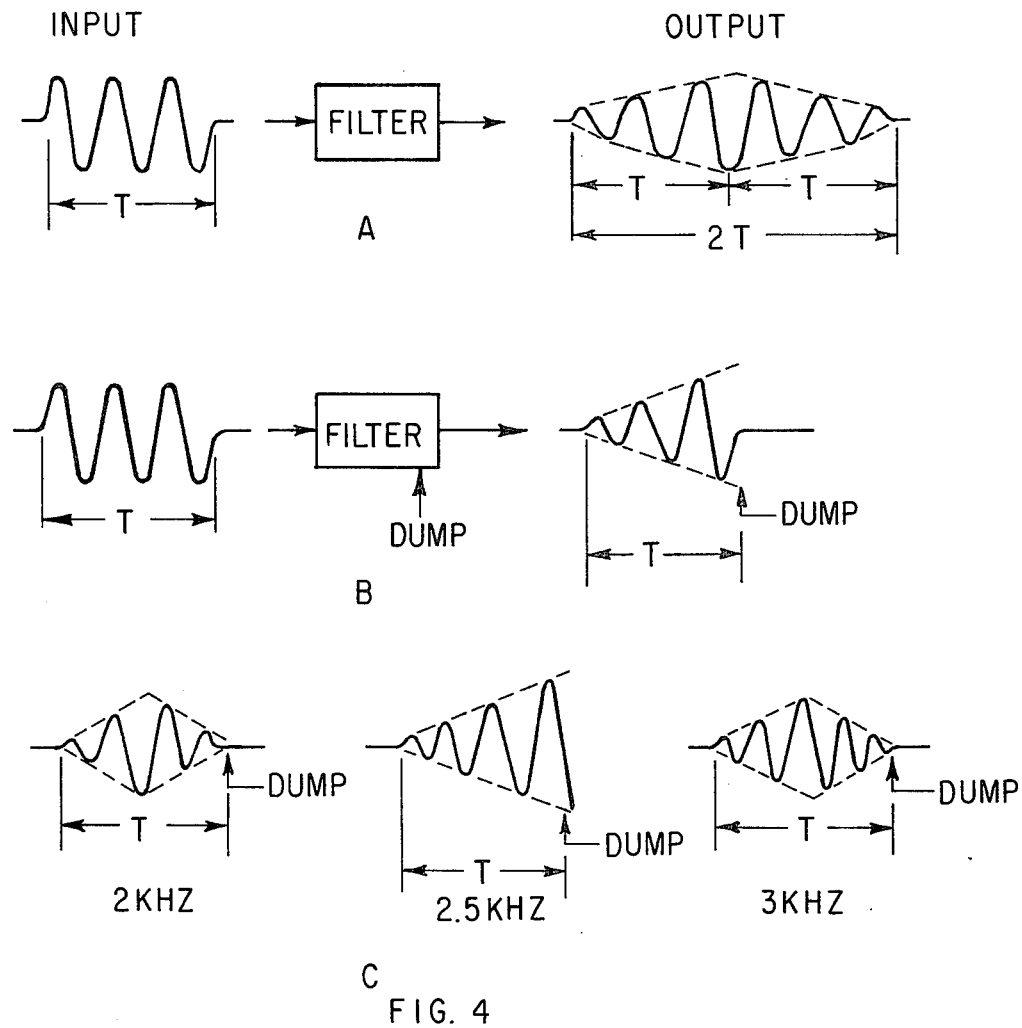
FIG. 4 illustrates the principles of integrate and dump filtering.

Referring now to FIG. 4, the action of the integrate and dump filters is illustrated for a coherent audio frequency input signal. Please recall that the audio frequency signal sent into the filter is a rectangular essentially constant amplitude block of a sine wave form, there being an integral number of cycles in the block, and the circuits of the transmitter were arranged so that the first cycle of audio frequency commenced at the beginning of the time T. Such a signal is shown at the left, marked "INPUT" in part A of FIG. 4. When such a signal is passed through a filter of reasonable sharpness, i.e., the Q of the filter is selected to allow the signal to reach a maximum value at time T, the filter being tuned to the fundamental frequency of the input signal shown, the output without any additional circuitry has a diamond-shaped envelope, as shown under the column marked "OUTPUT" on the right of A. The signal builds up during a period T and decays in a similar period essentially to zero. As earlier mentioned, this illustrates that in an off-on switching system, error must be avoided by leaving an interval of time T without signal after each signal block of length T is sent or the time T must be less than 2 ms. However, as shown in part B, of FIG. 4, if there is incorporated in the filter a means of dumping it, that is, quenching or zeroing the output of the filter after a time T equal to 2 ms, the envelope of the filtered signal will be triangular in shape, having a maximum at the instant of dump. Such dumping action can be achieved, as shown in FIG. 3, by the incorporation of a stroboscopically actuated switch which sharply reduces the amplifier gain instantaneously at the dump instant. As soon as this switch reopens, the filter is ready to act on the following block of audio signal on bus 62.

In part C of FIG. 4 is shown the action of filters of this type on input signals which are of differing frequencies. For example, if the input block of coherent audio signals forming the bit of length T be of a frequency of 2.5 kilohertz, the signal through the 2-kilohertz filter will grow to a maximum at T/2, then decrease essentially to zero by the dump interval T. The same occurs at the 3-kilohertz filter and, in fact, any filter tuned to an integral multiple of the basic 500-cycle frequency other than the 2.5-kilohertz filter matching the input signal. Its output (shown in the center of C) is identical with that shown at B.

From this, it is apparent that the maximum contrast in output of the various filters to an individual coherent audio frequency block occurs at the dump interval T (reference is again made to digital communication system, University of Michigan publication 7313, "Fundamental Data Modulation Techniques," p. 39, Seymore Stein). Accordingly, it should be remembered that the outputs on lines 71, 72, 73, from the integrate and dump filters 64–66, differ mostly widely in their amplitudes at the dump instant.

The amplitude differences of the signals on line 71–73 from the integrate and dump filters are further emphasized by the use of identical so-called "level detectors" 74-6, the circuit elements of one of which are given in detail. These act both to rectify the signal and to produce a nonlinear amplitude output which increases as the amplitude of the input signal increases. For example, the output of unit 74 increases approximately as the square of the amplitude of the envelope of the signal on line 71.

The output of the level detectors, in turn, is individually passed through identical low-pass filters 77–79.

The difference between the output of the 2-kilohertz channel on line 80 and the 2.5 kilohertz channel on line 81, after passing through 1-megohm isolating resistors, is amplified by operational amplifier OA 8 (83). Similarly, the difference between the signal on the 2-kilocycle channel, line 80, and that on the 3 kilocycle channel, line 82, is amplified by operational amplifier OA 9 (84). The output of units 83 and 84 are passed into AND gate 86, the third input to which is the pulse on the strobe circuit line 69. Accordingly, there will be an output from AND gate 86 only when there is a signal on line 80 (2-kilocycle channel) and none on both lines 81 and 82 from the 2.5- and 3-kilohertz channels, respectively.

Similarly, operational amplifier OA 10 (85) amplifies the difference between the signals on lines 81 and 82, i.e., the difference between the response of the 2.5-kilohertz and 3-kilohertz channels. The amplified output of this amplifier after passing through a 22,000-ohm buffer resistor goes to AND gate 87, to which the other input is also the strobe signal.

It is thus seen that the outputs of the two AND gates 86 and 87 can be nonzero only at the instant of the strobe pulse, so that this output is obtained essentially at the instant of quenching of the signal in units 64–66. Thus the output of the AND gates represents the maximum difference in signals between different frequency channels, which was precisely the effect desired to be obtained with the coherent frequency-shift signaling system employed. The output of the two AND gates 86 and 87 are employed for the command, addressing and header information functions required at each SGR. In essence, the signal on line 88 at the output of AND gate 86 (see FIG. 2) represents when there is a 2-kilohertz signal and no 2.5- or 3-kilohertz signal. Since this information involves such things as the end of the individual addresses, the end of address transmission (EOAT), the header start, and the interval of recording, each one of which is characterized by an individual difference in length of signal, it is apparent that the output on line 88 is in effect the command signals for the SGR. On the other hand, the signal at the output of line 89 from AND gate 87 represents the signal data put in on the 2.5- and 3-kilohertz channels, that is, the 1's and the 0's of the various addresses, header data, instant at which recording commences (end of the time zero gap), timing pulses, shut-off of the system at the end of record, and the like.

Separation of such signals is simple, as shown, for example, in the system of FIG. 5. Unit 90 is another program counter with a clock input from the strobe channel 69. It is responsive to the input on line 88 and has various outputs, depending upon the length of time involved in the signal from line 88. Thus, for example, the signal for end of block (EOB) (line 91) or "write load" requires 16 consecutive marks or 32 ms of 2000 hertz on line 88. The signal on line 88 enables the counter. Strobe pulses on line 69 clock the counter. Therefore, the counter counts the duration of 2000-hertz signal by counting strobe pulses and at the count of 16 an output is generated on line 91. This output enables the EOB command generator 97. The counter is reset at the end of each enable pulse on line 88. Therefore, consecutive commands are generated by consecutive bursts of the 2000-hertz tone.

Similarly, counter 90 puts out an actuating signal to gate 92 at the start of address transmission, 500 ms after the 2.5-kilohertz and 500-hertz signals have been turned on. This permits the logical 1's and 0's on line 89 to pass through gate 92 to the decode system 93. As shown in the cited patent, this turns on the SGR. Similarly, an actuating pulse is sent out by counter 90 to gate 94 responsive to the 32-ms signal of 2-kilohertz frequency, to pass output from line 89 into the header data system 95. Other commands can be carried out through separate outputs of the counter 90, as shown, for example, by unit 96.

The units 97, 93, and 95, respectively, will be recognized as functionally the exact equivalent units to units 120, 114, and 119 of FIG. 4 of the cited patent, the functions of which have already been described in that patent. If desired, the strobe line 69 can pass into the strobe unit 118 of FIG. 4 of the cited patent.

It is believed that with the bandwidth restrictions of standard licensed geophysical radio channels this digital communication system illustrated is near optimum, practical, and economic. It is unique to the use of particular referenced audio frequencies and audio-frequency channel separation. The actual circuitry is novel in simplicity by using count-down circuits and by adjusting phases to achieve coherent frequency blocks, and stroboscopically actuating the integrate and dump filters from the 500-hertz reference frequency.

The use of this system improved the detection threshold of signals to noise in an otherwise equivalent SGR system, and the probability for error was reduced by a factor of approximately 10 for signal-to-noise ratios in the order of 6 dB less than the signaling system disclosed in the referenced patent. This coherent frequency-shift keying system provides excellent digital control for the SGR system by recognition that the standard licensed geophysical radio system with its maximum audio frequency of 3000 hertz can actuate the SGR's on multiple frequencies which are integral multiples of a standard frequency, such as 500 cycles. This permits six audio-frequency channels. There is a minimum of two audio frequencies among these specifically chosen for commands for the digital encoding, one frequency (such as 3-kilohertz) being used with the 500-hertz signal for a logical 1, and another of the selected frequencies, such as 2.5-kilohertz with the 500-hertz signal for a logical 0. The base frequency (500-hertz) is also used with a frequency such as 2-kilohertz for commands where the number of commands may be used to further control the desired functions. It is to be particularly noted that the implementation of the coherent frequency-shift keying system with integrate and dump filtering has been realized with a very modest amount of circuitry. Thus, for example, since the 500-hertz strobe pulse already exists (to be used in sampling the seismometer input), each active filter is dumped by a single unit, an electronic switch controlled by the strobe pulse.

I claim:
1. In a cableless seismic digital recording system using a plurality of portable seismic group recorders to record at selected time intervals the output of geophones located near said recorders, each such recorder being actuated by a limited energy source and possessing a receiver adapted for receiving high-frequency signals modulated by low-frequency signals from a control point remote from at least part of said recorders through a communication link, said receiver having a plurality of frequency-selective low-frequency circuits for channeling demodulated signals to control automatically the operation of said recorder, including selectively turning on only certain predetermined units of said recorders, actuation of recording medium motion by said source, recording digitally the output of geophones of said medium following recording of identifying header data, and turning off said recorder, the improvement comprising
   a. modulating a high-frequency signal radiated from said control point only by blocks of substantially constant amplitude low monofrequency signals, each block existing for a time T where T is constant and chosen such that each block contains an integral number of cycles of sine wave signals, plus one essentially continuous monofrequency timing wave, the frequency of each said block monofrequency being different from all others and related to the frequency of said timing wave by one being an integral multiple of the other, and all blocks being coherent, that is, each starting sinusoidally from zero in the same polarity using frequency-shift keying for said modulating;
   b. receiving and demodulating said high-frequency signal at said recorders and filtering the demodulated low-frequency signals in parallel through a plurality of filter channels, each tuned to one only of the monofrequencies of said blocks;
   c. detecting relative amplitudes of the electric output in said channels periodically and substantially at a time T in a plurality of predetermined combinations, each being sent automatically in accordance with each separate combination and the number of uninterrupted repetitions of said combination to a separate control circuit of said recorder, and
   d. quenching all of said filter channels tuned to the frequencies of said block signals briefly, substantially simultaneously, and periodically at a time T, such time of quenching occurring just subsequent to the detecting step (c).

2. A system in accordance with claim 1 in which the maximum licensed audio frequency permitted is $f_1$, the timing wave frequency is $f_2 = f_1/N$ where $N$ is an integer between 4 and 10, and each coherent monofrequency of said blocks of sine wave signals is an integral multiple of $f_2$, one set of said blocks having the monofrequency $f_1$.

3. A system in accordance with claim 2 in which the coherent monofrequency of each separate set of blocks of sine wave signals is separated from the adjacent monofrequency of another such set by the value $f_2$.

4. A system in accordance with claim 3 in which the frequency $f_1$ is 3000 hertz, the frequency of the wave $f_2$ is 500 hertz, and the frequency separation of said sets of blocks is 500 hertz.

5. A system in accordance with claim 3 in which the frequency-shift keying of the addresses of the selected recorders to be turned on for any one seismic record is carried out in a digital code employing the two sets of blocks of sine wave signals at the monofrequencies $f_1$ and $f_1-f_2$, one said set representing logical 1's and the other logical 0's of said digital code.

6. A system in accordance with claim 5, including the step of employing at least a third set of blocks of sine wave signals at coherent monofrequencies other than $f_1$ and $f_1-f_2$, and in which control of various functions of each said recorder involves detection of amplitude of said at least a third set of blocks of sine wave signals and simultaneous absence of appreciable amplitude of the said first two, higher block monofrequencies.

7. A system in accordance with claim 6, including the steps of
   e. rectifying and nonlinearly employing the output from each periodically quenched filter channel such that large amplitude output from said channels is amplified greater than low amplitude outputs therefrom, and
   f. low-frequency filtering separately and substantially identically the output from step (e) before detection step (c).

* * * * *